(12) United States Patent
Nagora et al.

(10) Patent No.: US 9,211,770 B2
(45) Date of Patent: Dec. 15, 2015

(54) TIRE PRESSURE MONITORING UNIT AND METHOD FOR PRODUCING A TIRE PRESSURE MONITORING UNIT

(71) Applicant: Huf Hülsbeck & Fürst GmbH & Co. KG, Velbert (DE)

(72) Inventors: Andreas Nagora, Bretten (DE); Sisay Tadele, Leonberg (DE)

(73) Assignee: Huf Hülsbeck & Fürst GmbH & Co. KG, Velbert (DE)

( * ) Notice: Subject to any disclaimer, the term of this patent is extended or adjusted under 35 U.S.C. 154(b) by 79 days.

(21) Appl. No.: 14/099,955

(22) Filed: Dec. 8, 2013

(65) Prior Publication Data

US 2014/0090463 A1   Apr. 3, 2014

Related U.S. Application Data

(63) Continuation of application No. PCT/EP2012/060873, filed on Jun. 8, 2012.

(30) Foreign Application Priority Data

Jun. 9, 2011   (DE) .......................... 10 2011 103 666

(51) Int. Cl.
*B60C 23/02* (2006.01)
*B60C 23/04* (2006.01)

(52) U.S. Cl.
CPC ......... *B60C 23/0491* (2013.01); *B60C 23/0494* (2013.01)

(58) Field of Classification Search
None
See application file for complete search history.

(56) References Cited

U.S. PATENT DOCUMENTS

| | | | |
|---|---|---|---|
| 6,647,772 B2 | 11/2003 | Ito et al. | |
| 8,072,321 B2 | 12/2011 | Lynn | |
| 8,074,508 B2 | 12/2011 | Luce | |
| 2003/0000297 A1* | 1/2003 | Ito et al. ........................... | 73/146 |
| 2003/0217595 A1* | 11/2003 | Banzhof et al. ............... | 73/146.8 |
| 2004/0163456 A1* | 8/2004 | Saheki et al. ................. | 73/146.8 |
| 2005/0046557 A1* | 3/2005 | Katou ........................... | 340/442 |
| 2006/0021426 A1 | 2/2006 | Pozzi | |
| 2006/0220812 A1* | 10/2006 | Luce ............................. | 340/442 |
| 2006/0272402 A1 | 12/2006 | Yin et al. | |
| 2007/0295076 A1 | 12/2007 | Blossfeld et al. | |
| 2010/0328059 A1* | 12/2010 | Kanenari ...................... | 340/447 |
| 2012/0017672 A1* | 1/2012 | Uh et al. ...................... | 73/146.8 |

(Continued)

FOREIGN PATENT DOCUMENTS

| | | |
|---|---|---|
| DE | 100 47 853 B4 | 2/2002 |
| DE | 101 31 411 A1 | 2/2003 |

(Continued)

*Primary Examiner* — Andre Allen
(74) *Attorney, Agent, or Firm* — Hackler Daghighian & Martino

(57) ABSTRACT

A tire pressure monitoring unit includes a measurement and transmission electronics unit for measuring and wirelessly transmitting pressure information. A power source supplies power to the measurement and transmission electronics unit. A plastic body embeds the measurement and transmission electronics unit and also the power source. A metal carrier sheet, which carries the measurement and transmission electronics unit and also the power source, protrudes out from the plastic body with a fastening portion, which has a fastening hole. A method for producing a tire pressure monitoring unit is also disclosed.

15 Claims, 2 Drawing Sheets

(56) References Cited

U.S. PATENT DOCUMENTS

| | | | |
|---|---|---|---|
| 2013/0335215 A1* | 12/2013 | Li | B60C 23/02 340/442 |
| 2014/0352420 A1* | 12/2014 | Brusarosco et al. | 73/146.5 |
| 2014/0355648 A1* | 12/2014 | Brusarosco et al. | 374/143 |
| 2014/0360019 A1* | 12/2014 | Brusarosco et al. | 29/894.3 |

FOREIGN PATENT DOCUMENTS

| | | |
|---|---|---|
| EP | 1 270 277 A2 | 1/2003 |
| JP | 2006 188097 A | 7/2006 |
| JP | 2008 120125 A | 5/2008 |
| WO | 2010 053515 A1 | 5/2010 |

\* cited by examiner

TIRE PRESSURE MONITORING UNIT AND METHOD FOR PRODUCING A TIRE PRESSURE MONITORING UNIT

CROSS-REFERENCE TO RELATED APPLICATIONS

This continuation application claims priority to PCT/EP2012/060873 filed on Jun. 8, 2012 which has published as WO 2012/168418 A1 and also the German application number 10 2011 103 666.4 filed on Jun. 9, 2011, the contents of which are fully incorporated herein with these references.

DESCRIPTION

1. Field of the Invention

The present invention generally relates to tire pressure monitoring.

2. Background of the Invention

The present invention relates to a tire pressure monitoring unit having the features specified in the claims. A tire pressure monitoring unit is known from EP 1 270 277 A2, the contents of which are incorporated herein by reference.

Tire pressure monitoring units contain a sensor for measuring the tire pressure and are mounted on wheels of vehicles. During operation, tire pressure monitoring units wirelessly transmit information concerning the air pressure of the vehicle tire to a central unit. Tire pressure monitoring units together with the central unit form a tire pressure monitoring system.

In order to produce a tire pressure monitoring unit, it is known from EP 1 270 277 A2 to insert mould a measurement and transmission electronics unit together with a battery and a valve shaft using plastic and to thus produce a casing of the tire pressure monitoring unit. Advantageously, a tire pressure monitoring unit can thus be produced cost effectively, of which electrical components are protected effectively against harmful environmental influences and which can be mounted with little effort to the wheel of a vehicle.

An object of the present invention is to specify a way in which the costs of a tire pressure monitoring system can be further reduced. This object is achieved by a tire pressure monitoring unit having the features specified in the claims and also by a method according to the claims. Advantageous refinements of the invention are the matter of dependent claims.

SUMMARY OF THE INVENTION

In an exemplary embodiment of the present invention, a tire pressure monitoring unit includes a measurement and transmission electronics unit for measuring and wirelessly transmitting pressure information. A power source supplies power to the measurement and transmission electronics unit. A plastic body in which the measurement and transmission electronics unit and also the power source are embedded. A metal carrier sheet includes a main portion and a fastening portion. The main portion carries the measurement and transmission electronics unit and also the power source. The fastening portion protrudes out from the plastic body and having a fastening hole.

In other exemplary embodiments, the fastening portion may be bent with respect to the main portion of the metal carrier sheet. The fastening portion may enclose an angle between 90° and 150° with the main portion. The fastening hole may be a slot.

The measurement and transmission electronics unit may be arranged on a circuit carrier plate, which rests on the metal carrier sheet. The power source may sit on the circuit carrier plate.

At least one retaining tab may be punched out from the metal carrier sheet and bent up, and which holds the circuit carrier plate.

The underside of the main portion of the metal carrier sheet carrying the measurement and transmission electronics unit and the power source may be covered at least in part by the plastic body or covered completely by the plastic body.

The power source may be a generator.

In another exemplary embodiment of the present invention, a tire pressure monitoring unit includes a metal carrier sheet comprising a main portion and a fastening portion, the fastening portion including a fastening hole. A circuit carrier plate is attached to the metal carrier sheet. A measurement and transmission electronics unit for measuring and wirelessly transmitting pressure information is disposed on the circuit carrier plate. A power source supplying power to the measurement and transmission electronics unit is disposed on the circuit carrier plate. An overmould plastic body embedds the main portion of the metal carrier sheet, the circuit carrier plate, the measurement and transmission electronics unit and the power source. The fastening portion and the fastening hole protrude out from the overmould plastic body.

A method for producing a tire pressure monitoring unit, wherein a measurement and transmission electronics unit for measuring and wirelessly transmitting pressure information and also a power source for supplying power to the measurement and transmission electronics unit are overmoulded with plastic so as to form a plastic casing of the tire pressure monitoring unit, wherein the measurement and transmission electronics unit and also the power source, before the overmoulding process, are arranged on a metal carrier sheet, which comprises a main portion, on which the measurement and electronics unit is arranged, and a fastening portion having a fastening hole, and during the overmoulding process the fastening portion is left free, such that the fastening portion protrudes out from the plastic casing formed by overmoulding.

Other features and advantages of the present invention will become apparent from the following more detailed description, when taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

Figure 1:
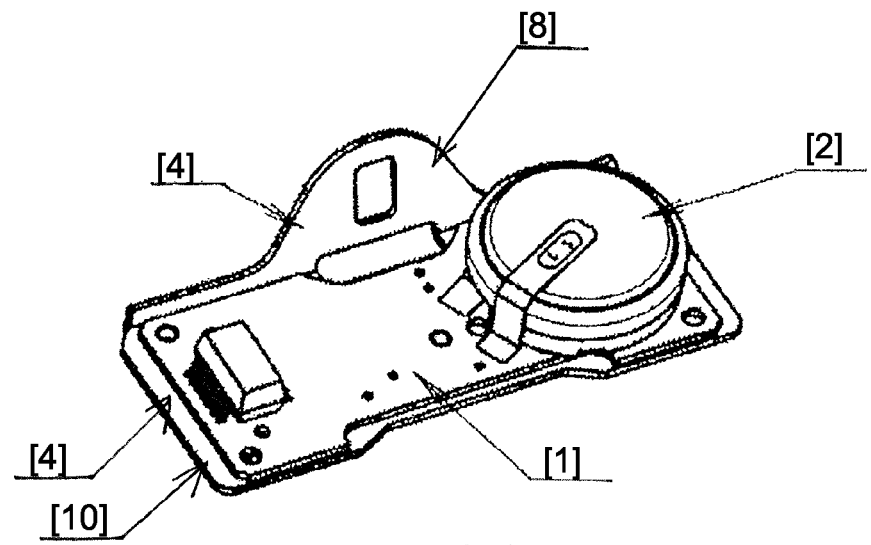
FIG. 1 shows a schematic illustration of a tire pressure monitoring unit with-out a casing, specifically an assembly consisting of a metal carrier sheet and a circuit carrier plate with a measurement and transmission electronics unit and a power source.
Figure 2:
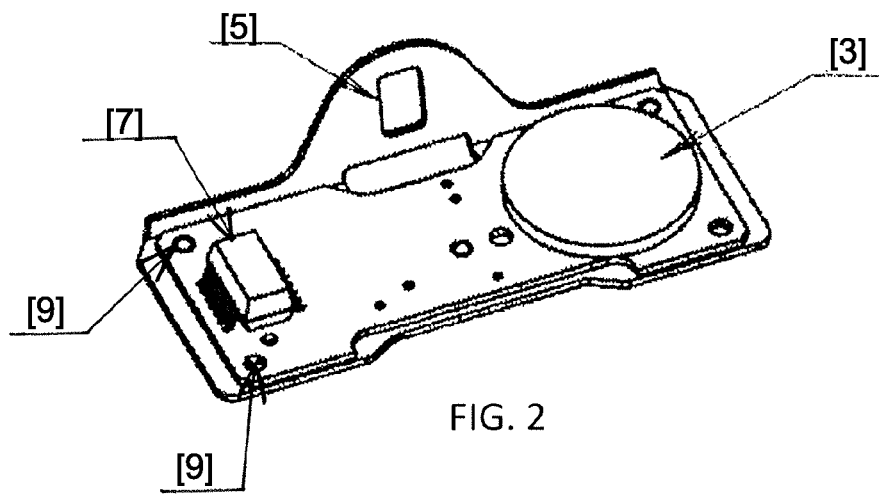
FIG. 2 shows the assembly illustrated in FIG. 1, without the power source.

A tire pressure monitoring unit according to the invention has a metal carrier sheet (4), which carries the measurement and transmission electronics unit (7) and also the power source (2). Before the overmoulding with plastic (6), the measurement and transmission electronics unit and also the power source can be preassembled on the metal carrier sheet so as to create a unit that can be easily handled and which can then be overmoulded with plastic in order to create a casing of the tire pressure monitoring unit. After the overmoulding process, a fastening portion (8) of the metal carrier sheet (4) protrudes out from the plastic body forming a casing. The fastening portion has a fastening hole (5) by means of which the tire pressure monitoring unit can be fitted onto a valve shaft or through which a screw can be passed, for example, by means of which the tire pressure monitoring unit can be fastened to a valve spud, for example. The dual function of the metal carrier sheet enables both a fastening of the tire pressure monitoring unit to a vehicle wheel and also a preassembling of an assembly that can be easily handled and overmoulded with plastic. Thus, considerable cost savings can be achieved.

In an advantageous refinement of the invention, the fastening portion is bent with respect to a main portion of the metal carrier sheet. The main portion carries the measurement and transmission electronics unit. The tire pressure monitoring unit can thus sit on the base of a rim well and nevertheless can be fastened via the fastening portion to a valve shaft or another fastening element. In particular, it is advantageous if the fastening portion encloses an angle from 90° to 150° with the main portion.

In a further advantageous refinement of the invention, the measurement and transmission electronics unit is arranged on a circuit carrier plate (1), which rests on the metal carrier sheet. The power source (2) preferably also sits on the circuit carrier plate. It is also possible for the power source to be arranged beside or below the circuit carrier plate. The use of a circuit carrier plate facilitates the preassembly of the metal carrier sheet with the measurement and transmission electronics unit and the power source to form an assembly, which can then be overmoulded. At least one retaining tab (9) is preferably punched out from the metal carrier sheet and set up, and holds the circuit carrier plate. The circuit carrier plate can thus be fastened already to the metal carrier sheet, before the overmoulding process. The preassembled assembly formed from the metal carrier sheet, measurement and transmission electronics unit, and power source can thus be handled more easily.

A tire pressure monitoring unit according to the invention is produced by arranging on a metal carrier sheet a measurement and transmission electronics unit for measuring and wirelessly transmitting pressure information and also a power source for supplying power to the measurement and transmission electronics unit, and by then overmoulding with plastic so as to form a plastic casing of the tire pressure monitoring unit. When overmoulding, a fastening portion having a fastening hole is left free, such that the fastening portion protrudes out from the plastic casing formed by overmoulding.

Figure 3:
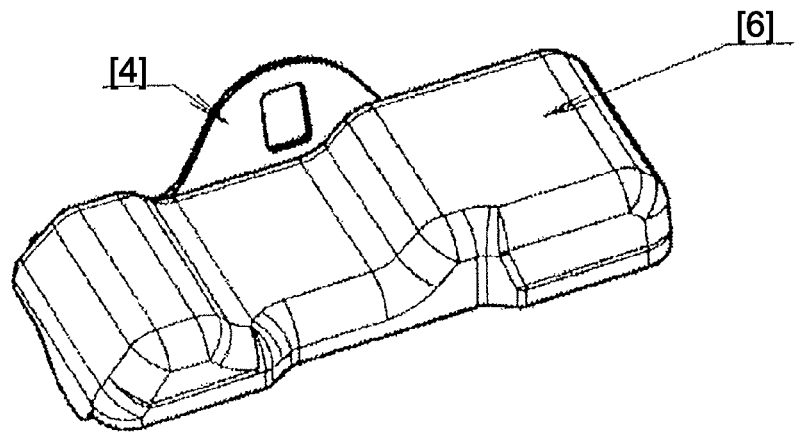
FIG. 3 shows a tire pressure monitoring unit produced by overmoulding the assembly illustrated in FIG. 1 with plastic.
Figure 4:
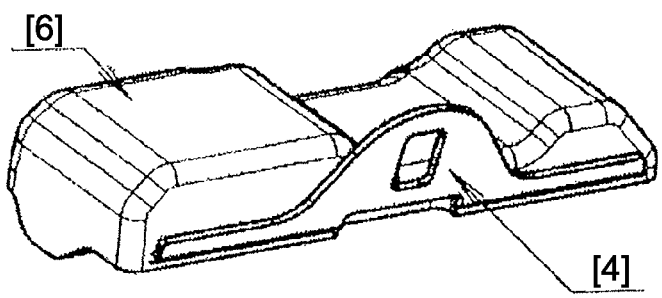
FIG. 4 shows a further view of FIG. 3.

The tire pressure monitoring unit illustrated in FIGS. 3 and 4 consists of a plastic casing (6) and an assembly illustrated in FIG. 1, around which a plastic body (6) has been moulded as a casing. The assembly illustrated in FIG. 1 consists of a metal carrier sheet (4), which carries a circuit carrier plate (1) with a measurement and transmission electronics unit and also a power source (2), for example a battery.

The battery (2) sits in the illustrated example on a contact (3) of the circuit carrier plate (1). The energy source (2) may also be arranged between the circuit carrier plate (1) and metal carrier sheet (4), or on the metal carrier sheet (4) beside the circuit carrier plate (1). Instead of a battery (2), a generator, for example a piezoelectric generator, may also be used as a power source.

The metal carrier sheet (4) has a main portion, on which the measurement and transmission electronics unit and also the power source (2) are arranged, and a fastening portion comprising a fastening hole (5), which is preferably formed as a slot. As shown in FIGS. 3 and 4, the fastening portion (8) protrudes out from the plastic casing (6). The fastening portion is bent with respect to the main portion and encloses an angle between 90° and 150° therewith.

The main portion (10) of the metal carrier sheet (4) preferably has a slightly larger area than the circuit carrier plate (1) resting thereon. The circuit carrier plate (1) can thus be assembled more easily on the main portion. One or more retaining tabs may be punched out from the metal carrier sheet (4) and bent up, and hold the circuit carrier plate (1). Corresponding tabs may engage, for example, in apertures in the circuit carrier plate (1). The circuit carrier plate (1) however can be fastened otherwise, for example, to the metal carrier sheet (4), for example by adhesive bonding or riveting.

When overmoulding the assembly shown in FIG. 1, that is to say for example the circuit carrier plate (1) with the measurement and transmission electronics unit (7) and also the power source (2) and the metal carrier sheet (4), the underside of the main portion of the metal carrier sheet (4) is preferably also covered by plastic (6), such that only the fastening portion (8) of the metal carrier sheet (4) protrudes out from the plastic casing (6).

REFERENCE NUMBERS

1 Circuit Carrier Plate
2 Power Source
3 Contact
4 Metal Carrier Sheet
5 Fastening Hole
6 Plastic Body
7 Measurement and Transmission Electronics Unit
8 Fastening Portion
9 Retaining Tab
10 Main Portion Although several embodiments have been described in detail for purposes of illustration, various modifications may be made to each without departing from the scope and spirit of the invention. Accordingly, the invention is not to be limited, except as by the appended claims.

What is claimed is:

1. A tire pressure monitoring unit, comprising:
   a measurement and transmission electronics unit for measuring and wirelessly transmitting pressure information;
   a power source supplying power to the measurement and transmission electronics unit;
   a plastic body in which the measurement and transmission electronics unit and also the power source are embedded; and
   a metal carrier sheet comprising a main portion and a fastening portion, said main portion carrying the measurement and transmission electronics unit and also the power source, said fastening portion protruding out from the plastic body and having a fastening hole.

2. The tire pressure monitoring unit according to claim 1, wherein the fastening portion is bent with respect to the main portion of the metal carrier sheet.

3. The tire pressure monitoring unit according to claim 2, wherein the fastening portion encloses an angle between 90° and 150° with the main portion.

4. The tire pressure monitoring unit according to claim 1, wherein the fastening hole is a slot.

5. The tire pressure monitoring unit according to claim 1, wherein the measurement and transmission electronics unit is arranged on a circuit carrier plate, which rests on the metal carrier sheet.

6. The tire pressure monitoring unit according to claim 5, wherein the power source sits on the circuit carrier plate.

7. The tire pressure monitoring unit according to claim 5, wherein at least one retaining tab is punched out from the metal carrier sheet and is bent up, and holds the circuit carrier plate.

8. The tire pressure monitoring unit according to claim 1, wherein the underside of the main portion of the metal carrier sheet carrying the measurement and transmission electronics unit and the power source is covered at least in part by the plastic body.

9. The tire pressure monitoring unit according to claim 1, wherein the underside of the main portion of the metal carrier sheet carrying the measurement and transmission electronics unit and the power source is covered completely by the plastic body.

10. The tire pressure monitoring unit according to claim 1, wherein the power source is a generator.

11. A tire pressure monitoring unit, comprising:
- a metal carrier sheet comprising a main portion and a fastening portion, the fastening portion including a fastening hole, the fastening hole configured for fitting the tire pressure monitoring unit onto a valve shaft or through which a screw can be passed;
- a circuit carrier plate attached to the metal carrier sheet;
- a measurement and transmission electronics unit for measuring and wirelessly transmitting pressure information, the measurement and transmission electronics unit disposed on the circuit carrier plate;
- a power source supplying power to the measurement and transmission electronics unit, the power source disposed on the circuit carrier plate; and
- an overmould plastic body embedding the main portion of the metal carrier sheet, the circuit carrier plate, the measurement and transmission electronics unit and the power source, where the fastening portion and the fastening hole protrude out from the overmould plastic body.

12. The tire pressure monitoring unit according to claim 11, wherein the fastening portion is bent with respect to the main portion of the metal carrier sheet.

13. The tire pressure monitoring unit according to claim 12, wherein the fastening portion encloses an angle between 90° and 150° with the main portion.

14. The tire pressure monitoring unit according to claim 13, wherein the fastening hole comprises a slot.

15. A method for producing a tire pressure monitoring unit, wherein a measurement and transmission electronics unit for measuring and wirelessly transmitting pressure information and also a power source for supplying power to the measurement and transmission electronics unit are overmoulded with plastic so as to form a plastic casing of the tire pressure monitoring unit, wherein the measurement and transmission electronics unit and also the power source, before the overmoulding process, are arranged on a metal carrier sheet, which comprises a main portion, on which the measurement and electronics unit is arranged, and a fastening portion having a fastening hole, and during the overmoulding process the fastening portion is left free, such that the fastening portion protrudes out from the plastic casing formed by overmoulding.

\* \* \* \* \*